United States Patent
Siklodi et al.

(10) Patent No.: US 11,591,001 B2
(45) Date of Patent: Feb. 28, 2023

(54) STEERING COLUMN FOR A STEERING SYSTEM OF A MOTOR VEHICLE COMPRISING A CONTROL UNIT FOR TWO ADJUSTMENT DRIVES

(71) Applicants: thyssenkrupp Presta AG, Eschen (LI); thyssenkrupp AG, Essen (DE)

(72) Inventors: Miklos Siklodi, Lüchingen (CH); Gergoe Szegoe, Debrecen (HU); Daniel Vitalis, Budapest (HU)

(73) Assignees: THYSSENKRUPP PRESTA AG, Eschen (LI); THYSSENKRUPP AG, Esser (DE)

( * ) Notice: Subject to any disclaimer, the term of this patent is extended or adjusted under 35 U.S.C. 154(b) by 26 days.

(21) Appl. No.: 17/290,803

(22) PCT Filed: Nov. 12, 2019

(86) PCT No.: PCT/EP2019/080941
§ 371 (c)(1),
(2) Date: May 3, 2021

(87) PCT Pub. No.: WO2020/099362
PCT Pub. Date: May 22, 2020

(65) Prior Publication Data
US 2021/0403073 A1  Dec. 30, 2021

(30) Foreign Application Priority Data
Nov. 13, 2018  (DE) .................. 10 2018 128 399.7

(51) Int. Cl.
*B62D 1/181* (2006.01)
*B62D 1/185* (2006.01)
*B62D 1/187* (2006.01)

(52) U.S. Cl.
CPC ............. *B62D 1/181* (2013.01); *B62D 1/185* (2013.01); *B62D 1/187* (2013.01)

(58) Field of Classification Search
CPC ........ B62D 1/181; B62D 1/185; B62D 1/187; H02P 5/68; H02P 7/04
See application file for complete search history.

(56) References Cited

U.S. PATENT DOCUMENTS 6,242,875 B1 *  6/2001  Kusaka ................... H02P 6/085
                                                        318/560
2001/0013441 A1  8/2001  Furumi et al.
(Continued)

FOREIGN PATENT DOCUMENTS

CN        108367771 A      8/2018
DE   10 2014 101 995 A    1/2015
(Continued)

OTHER PUBLICATIONS

English Translation of International Search Report issued in PCT/EP2019/080941, dated Feb. 4, 2020.

*Primary Examiner* — Drew J Brown
(74) *Attorney, Agent, or Firm* — thyssenkrupp North America, LLC (57) ABSTRACT

A steering column may include a first adjustment drive for adjustments in a length adjustment direction and a second adjustment drive for adjustments in a height adjustment direction. The adjustment drives each have a drive motor. A joint control unit for the drive motors comprises three half bridges arranged in parallel and connected between two voltage potentials. Each half bridge has a high-side switch and a low-side switch connected in series via a connection point. The connection point of the first half bridge is electrically conductively connected to a first connection of a first drive motor. The connection point of a second half bridge is electrically conductively connected to a second
(Continued)

connection of the first drive motor and to a first connection of the second drive motor. The connection point of a third half bridge is electrically conductively connected to a second connection of the second drive motor.

18 Claims, 5 Drawing Sheets

(56) References Cited

U.S. PATENT DOCUMENTS

| | | |
|---|---|---|
| 2004/0245954 A1 | 12/2004 | Moench |
| 2008/0128197 A1 | 6/2008 | Kawaguchi |
| 2008/0238347 A1* | 10/2008 | Akiyama ................. H02P 6/04 |
| | | 318/34 |
| 2015/0134121 A1 | 5/2015 | Fukuda |
| 2018/0319419 A1 | 11/2018 | Kreutz et al. |
| 2021/0316782 A1* | 10/2021 | Lee ...................... B62D 5/0493 |

FOREIGN PATENT DOCUMENTS

| | | | |
|---|---|---|---|
| DE | 11 2013 002 726 T | 3/2015 | |
| DE | 10 2017 201 131 A | 7/2018 | |
| EP | 1 927 526 A | 6/2008 | |
| EP | 1927526 A1 * | 6/2008 | ............ B62D 1/181 |
| JP | 2012-170276 A | 9/2012 | |
| WO | WO-2014199021 A1 * | 12/2014 | ............ B62D 1/181 |

\* cited by examiner

STEERING COLUMN FOR A STEERING SYSTEM OF A MOTOR VEHICLE COMPRISING A CONTROL UNIT FOR TWO ADJUSTMENT DRIVES

CROSS REFERENCE TO RELATED APPLICATIONS

This application is a U.S. National Stage Entry of International Patent Application Serial Number PCT/EP2019/080941, filed Nov. 12, 2019, which claims priority to German Patent Application No. DE 10 2018 128 399.7, filed Nov. 13, 2018, the entire contents of both of which are incorporated herein by reference.

FIELD

The present disclosure generally relates to steering columns, including steering columns for steering systems of motor vehicles, and to methods for controlling drive motors of adjustable steering columns.

BACKGROUND

Adjustable steering columns are used to adjust the position of the steering wheel in relation to the driver's sitting position and are known in different designs. The vertical tilt of the steering column (height adjustment) and the distance of the steering wheel from the driver (length adjustment) can be set in many motor vehicles. It is known for the adjustments to be carried out by means of adjustment motors, wherein these adjustment motors are traditionally DC motors. Each of the adjustment motors is activated by a separate control unit using control electronics. Each set of control electronics typically comprises an H-bridge with switching elements of the power electronics, in particular power MOSFETs. Each of the H-bridges comprises a parallel circuit of two half bridges, each of the half bridges having a series circuit of two switching elements. Traditional control electronics therefore have four switching elements for each adjustment motor.

This kind of activation is known from the published patent application EP 1 927 526 A1 in which two motor driver circuits are provided which supply power to the respective motor, in order to realize the movement of the motor. The two motor driver circuits are activated by a central processor unit which responds to corresponding activation commands from the driver. Duplicate motor driver circuits of this kind are complex and costly.

Thus, a need exists for a height-adjustable and length-adjustable steering column for a steering system of a motor vehicle which is particularly simple and inexpensive.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to steering columns for steering systems of motor vehicles and to methods for controlling two drive motors of a steering column that is adjustable in the length adjustment direction and height adjustment direction.

Thus, a steering column for a steering system of a motor vehicle is provided comprising a first adjustment drive for adjusting the steering column in a length adjustment direction and a second adjustment drive for adjusting the steering column in a height adjustment direction, the first and second adjustment drives each having a drive motor for adjusting the steering column, the two drive motors having a joint control unit which comprises three half bridges arranged in parallel and connected between two voltage potentials, the half bridges each having two switching elements connected in series, one of the switching elements being a high-side switch and the other switching element being a low-side switch, and a connection point being formed between a high-side switch and a low-side switch of each half bridge, the connection point of a first half bridge being electrically conductively connected to a first connection of a first drive motor of the two drive motors, the connection point of a second half bridge being electrically conductively connected to a second connection of the first drive motor, the connection point of a third half bridge being electrically conductively connected to a second connection of a second drive motor of the two drive motors and the connection point of the second half bridge being electrically conductively connected to a first connection of the second drive motor. The number of switching elements can thereby be reduced to six by comparison with traditional control electronics from the prior art, which cuts costs and reduces complexity.

In a first embodiment, the second connection of the first drive motor and the first connection of the second drive motor can be energized simultaneously by the second half bridge. This means that by skillfully selecting the activation of the switching elements, simultaneous adjustment can be achieved in both directions. It may also be provided, however, that the second connection of the first drive motor and the first connection of the second drive motor can be energized alternately by the second half bridge. The adjustment drives are then energized separately from one another.

In the event that the drives are energized simultaneously, the rotational directions of the two drive motors are preferably opposing, so that a retraction and raising or an extension and lowering of the steering column preferably take place simultaneously.

The switching elements are preferably n-channel MOSFETs which are normally off.

In order to control the torque of the two drive motors, the switching elements of the first and third half bridges can preferably be activated using a PWM signal.

In an advantageous embodiment, the steering column comprises a support tube in which a casing tube is held displaceably in the length adjustment direction by means of the first adjustment drive, a steering shaft being mounted rotatably in the casing tube, and the support tube being fastened in a pivotable manner to a bracket that can be connected directly or indirectly to a body of the motor vehicle, the pivoting causing an adjustment of the casing tube and the steering shaft in respect of the support unit in the height adjustment direction.

The two drive motors are advantageously brushed DC motors. Alternatively, however, brushless, preferably synchronously controlled DC motors can be used.

Furthermore, a method for controlling two drive motors of a steering column for a steering system of a motor vehicle is provided, wherein the steering column can be adjusted in a length adjustment direction and a height adjustment direction, wherein a control unit for controlling the two drive motors comprises three half bridges arranged in parallel and connected between two voltage potentials, the half bridges each having two switching elements connected in series, one of the switching elements being a high-side switch and the other switching element being a low-side switch, and a connection point being formed between a high-side switch and a low-side switch of each half bridge, the connection point of a first half bridge being electrically conductively connected to a first connection of a first drive motor of the two drive motors, the connection point of a second half bridge being electrically conductively connected to a second connection of the first drive motor, the connection point of a third half bridge being electrically conductively connected to a second connection of a second drive motor of the two drive motors and the connection point of the second half bridge being electrically conductively connected to a first connection of the second drive motor, the first and the second drive motors being energized by means of the three half bridges. As has already being explained above, the reduced number of switching elements generates a cost benefit.

In a first embodiment, the two drive motors are energized simultaneously, a switching element of the second half bridge being permanently switched on and a switching element of the first and third half bridges in each case being permanently or cyclically switched on, the switching element of the second half bridge being assigned to a first supply line (high-side or low-side) and the other two switches each being assigned to another supply line (low-side or high-side). It is advantageous in this case for the two drive motors to be driven in opposite directions and to bring about a retraction and raising or an extension and lowering of the steering column.

In another embodiment, the two drive motors are energized alternately.

The switching elements are preferably n-channel MOSFETs which are normally off.

FIGS. 1 to 4 show a steering column 1 which has a support unit 10 that can be connected to the chassis of a motor vehicle not shown here, on which support unit 10 an actuator 16 is adjustably held. The support unit 10 comprises a bracket 100 which can be fastened to the chassis of the motor vehicle by means of fastening bores 102, for example.

The actuating unit 16 comprises a casing tube 12 in which a steering shaft 14 is rotatably mounted. A steering wheel, not shown here, can be fastened to the steering wheel end 141 of the steering shaft 14. The steering shaft 14 is used to transfer a steering moment, which is introduced by a driver via the steering wheel to the steering shaft 14 in a known manner, to a steerable wheel which is not shown here. The steering shaft 14 in this case may transfer the steering movement from the steering wheel to the steerable wheel with the interposition of a steering gear, possibly with the aid of auxiliary power assistance.

The casing tube 12 is held displaceably in a support tube 104 in a length adjustment direction X, the length adjustment direction X extending in the axial direction of the steering shaft 14. Through an adjustment of the casing tube 12 in respect of the support tube 104, a length adjustment of the steering shaft 14, and therefore of the steering wheel which is not shown, in order to adjust the position of the steering wheel to the sitting position of a driver of the motor vehicle, can be achieved accordingly.

The support tube 104 is fastened in a pivotable manner to the bracket 100 and can be swiveled about a pivot axis 106 in respect of the bracket 100. Adjustability of the actuator unit 16 in a height adjustment direction Z which is oriented substantially perpendicularly to the length adjustment direction X is moreover facilitated by the casing tube 12 being held on the bracket 100 by means of a pivoting mechanism 18. This results in the casing tube 12 and the steering shaft 14 being pivotable about the pivot axis 106 in respect of the support unit 10 and, in particular, in respect of the bracket 100 in such a manner that a height adjustment of the steering wheel not shown here and arranged on the steering shaft 14 is also achieved, so that an adjustment of the position of the steering wheel to the sitting position of the driver can also be achieved in this way.

In the exemplary embodiment, a separate adjustment drive 2,2' is provided for each of the two adjustment directions with a separate adjustment gear in each case, comprising a threaded rod 26,26' and a spindle nut 3.

A first adjustment drive 2 is provided by means of which an adjustment of the actuator unit 16 in respect of the carrier unit 10 in the length adjustment direction X can be achieved. The adjustment drive 2 comprises a threaded rod 26 which is connected to the casing tube 12 by means of a coupling lever 120. The coupling lever 120 is guided displaceably in a slot 110 in the carrier tube 104 in such a manner that a displacement of the coupling lever 120 in respect of the carrier tube 104 leads to a displacement of the actuator unit 16 in respect of the carrier unit 10.

The threaded rod 26 is held on the coupling lever 120 and extends in the length adjustment direction X. The threaded rod 26 is also held in a spindle nut 3 which has an internal thread 32 that is engaged with the external thread of the threaded rod 26. The spindle nut 3 is mounted in a rotatable but stationary manner in respect of the support tube 104 in a gear housing 34. in such a manner that a rotation of the spindle nut 3 on account of the thread engagement with the threaded rod 26 leads to an axial movement of the threaded rod relative to the spindle nut 3. In other words, a rotation of the spindle nut 3 leads to a relative movement between the casing tube 12 and the support tube 104 in such a manner that an adjustment of the position of the actuator unit 16 in respect of the carrier unit 10 is brought about by the rotation of the spindle nut 3.

Figure 4:
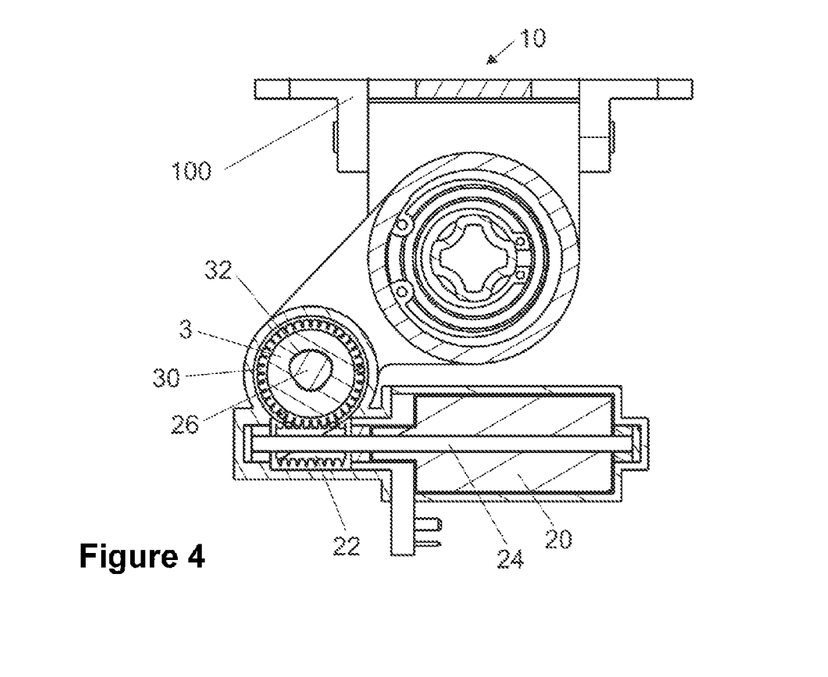
FIG. 4 is a schematic sectional view through the steering column in FIG. 2 along the plane A-A.

The adjustment drive 2 further comprises a drive motor 20 on the output shaft 24 of which a worm shaft 22 that can be clearly seen in FIG. 4 is arranged. The worm shaft 22 engages with an external toothing 30 of the spindle nut 3, the external toothing 30 being configured as a worm gear. The rotational axis of the worm shaft 22 and the rotational axis of the spindle nut 3 are perpendicular to one another, as is known per se in the case of a worm gear.

Accordingly, the spindle nut 3 can be rotated by a rotation of the output shaft 24 of the drive motor 20, which means that a length adjustment in the X-direction of the actuator unit 16 in respect of the support tube 104, and therefore a displacement of the actuator unit 16 in respect of the support unit 10, takes place.

Figure 1:
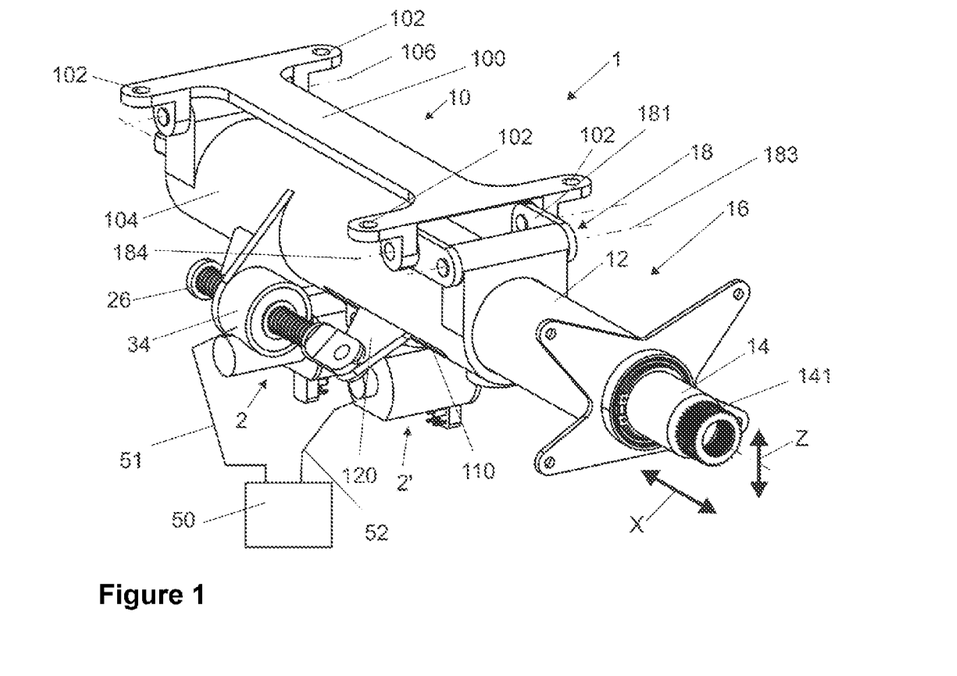
FIG. 1 is a schematic perspective view of an example steering column with electric adjustment.
Figure 2:
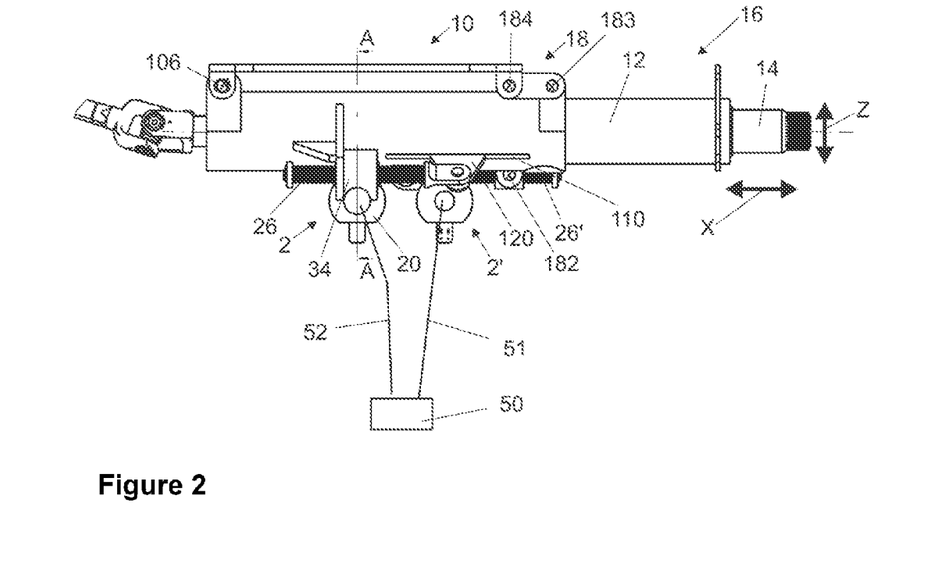
FIG. 2 is a schematic side view of the steering column from FIG. 1.
Figure 3:
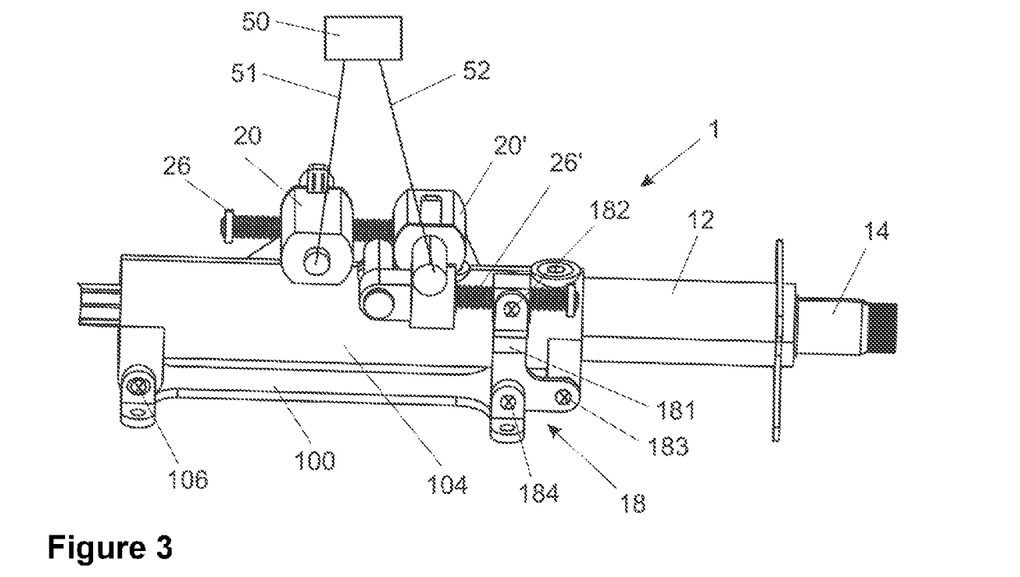
FIG. 3 is a further schematic side view of the steering column from FIG. 1.

A second adjustment drive 2' can be seen particularly clearly in FIG. 3. This second adjustment drive 2' has in principle the same design as the first adjustment drive 2. The second adjustment drive 2' initiates an adjustment movement of the actuator unit 16 in the height adjustment direction Z by means of a drive motor 20'. Through the rotation of a spindle nut 3, a threaded rod 26' is displaced in the axial direction. The threaded rod 26' is connected to an actuator lever 181 by means of a joint 182. The actuator lever 181 is pivotable in a joint axis 183 on the support tube 104 and in a joint axis 184 on the bracket 100. This means that by virtue of the spindle nut 3 the threaded rod 26' applies a corresponding adjustment to the pivoting mechanism 18 and therefore to the actuator unit 16 and the support tube 104. For a necessary length compensation, a corresponding compensation function is integrated in one of the joints. In this example, this is represented by a slot receiving means of a bolt forming the swivel axis 106 in the bracket.

The two drive motors 20,20' of the two adjustment drives 2,2' are energized via motor lines 51,52 by a joint control unit 50.

FIGS. 5 to 10 show a block diagram of the control unit 50 which is set up to energize the two DC drive motors 20,20', wherein different control states are depicted. The supply line 13+ is connected to the positive pole of the supply line; the supply line 13− is connected to the negative pole of the supply line or to the ground connection of the motor vehicle's on-board electrical system which usually works with DC voltage at negative ground. The control unit 50 comprises three half bridges HB1, HB2, HB3, a first half bridge HB1 comprising a series connection of first and fourth MOSFETs S1 S4. A second, center half bridge HB2 comprises a series connection of second and fifth MOSFETs S2, S5. A third half bridge HB3 comprises a series connection of third and sixth MOSFETs S3, S6. The MOSFETs S1, S2, S3 are assigned to the supply line 13+ and therefore high-side switches of the respective half bridge. The MOSFETs S4, S5, S6, are assigned to the supply line 13− and therefore low-side switches of the respective half bridge. The three half bridges in HB1, HB2, HB3 are connected to one another in parallel, a connection point between a first MOSFET of one of the half bridges HB1, HB2, HB3 and a second MOSFET of one of the half bridges HB1, HB2, HB3 being connected in an electrically conductive manner to one of the windings of the drive motors 20,20' in each case. A connection point between the second MOSFET S2 and the fifth MOSFET S5 of the second half bridge HB2 is connected in an electrically conductive manner to a winding of both drive motors 20,20' in each case.

Consequently, each of the two drive motors 20,20' is energized by two half bridges in each case, a first drive motor 20 being energized by the first and second half bridges HB1, HB2 and a second drive motor 20' being energized with the help of the second and third half bridges HB2, HB3. The second half bridge HB2 is therefore configured for joint energizing of both drive motors 20,20'.

The MOSFETs are provided as drivers which are usually switched in such a manner that their intrinsic or body diodes are switched in the off direction in relation to the onboard voltage. Depending on the control signals, they connect the lines 51,52 either to the positive potential or to the ground potential. n-channel MOSFETs, which are normally off, are therefore preferably used as MOSFETs. The MOSFETs are each activated via control line 54 by means of a gate driver 53. The transiently activated, and therefore switched on, MOSFETs are denoted by a circle in the figures.

Figure 5:
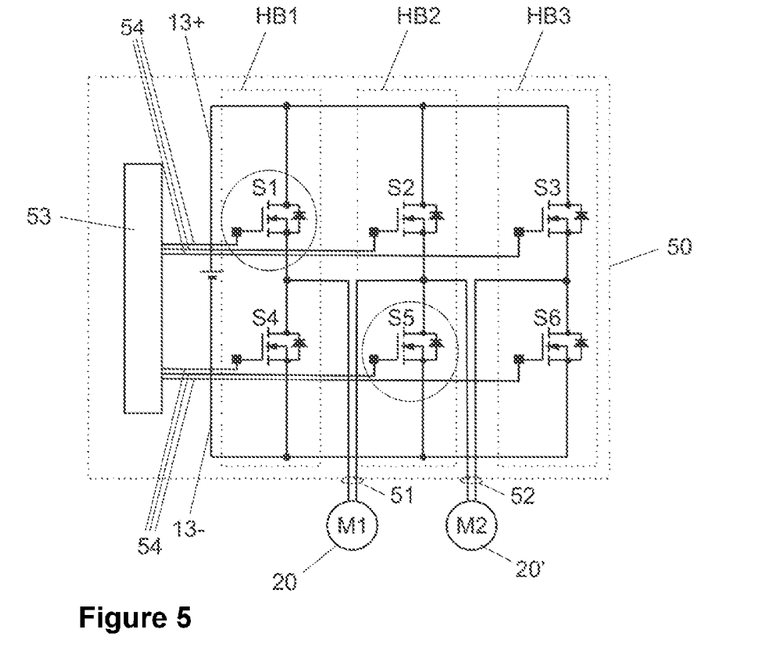
FIG. 5 is a block diagram illustrating activation of adjustment drives of a steering column when a single adjustment drive is energized.
Figure 6:
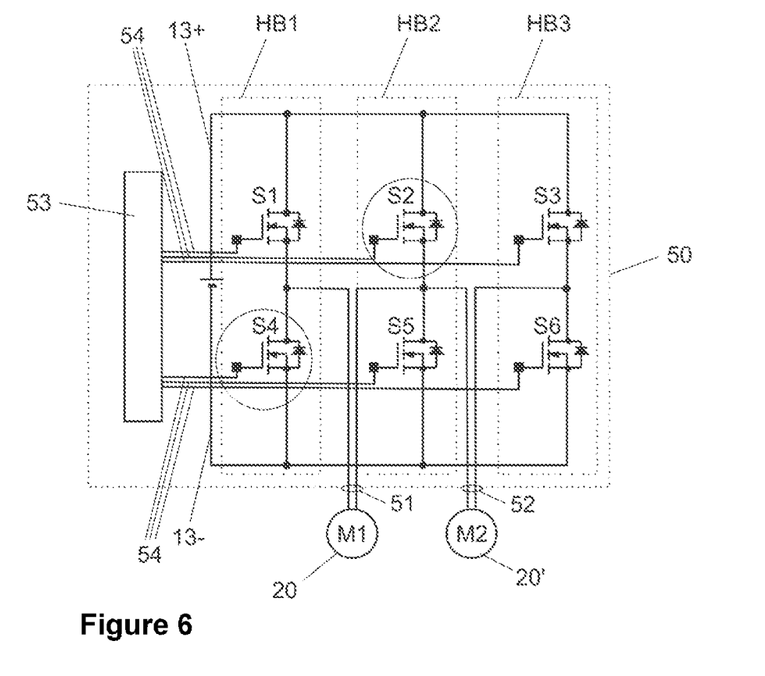
FIG. 6 is a block diagram as in FIG. 5 representing when a single adjustment drive is energized.
Figure 7:
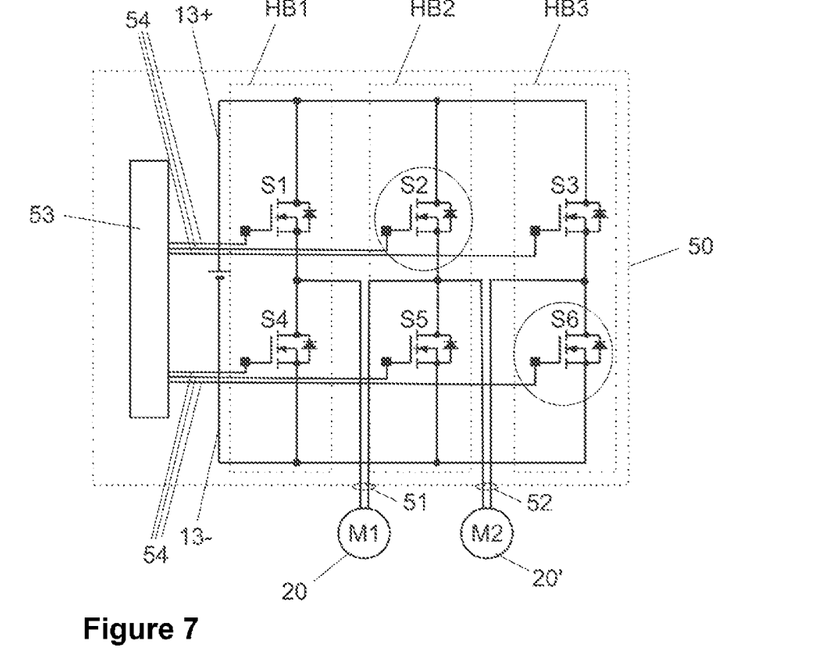
FIG. 7 is a block diagram as in FIG. 5 representing when a single adjustment drive is energized.
Figure 8:
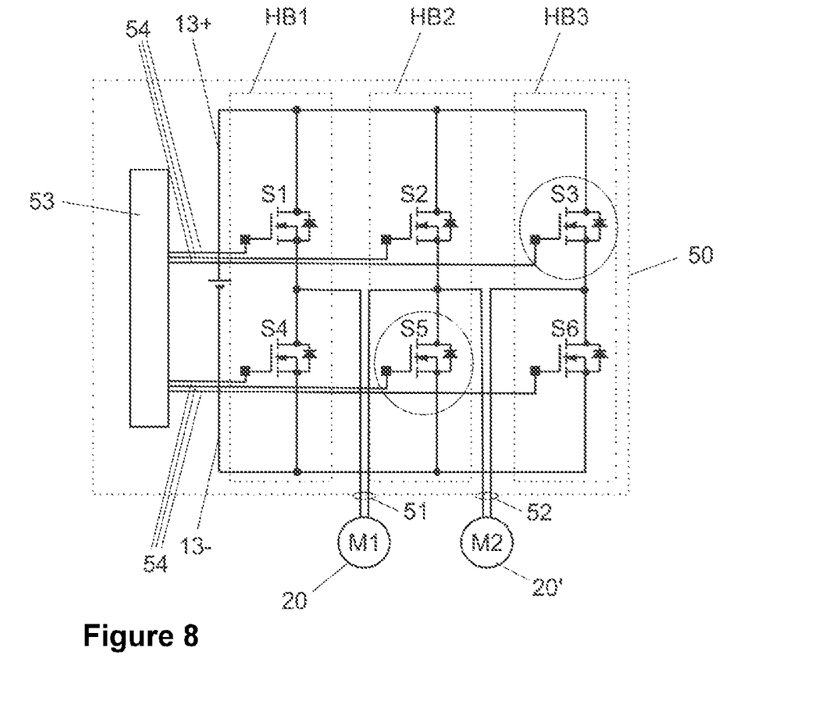
FIG. 8 is a block diagram as in FIG. 5 representing when a single adjustment drive is energized.

FIGS. 5 to 8 show energizing of only a single drive motor, FIGS. 5 and 6 showing energizing of the drive motor 20 of the length adjustment mechanism X and FIGS. 7 and 8 showing energizing of the drive motor 20' of the height adjustment mechanism Z.

FIG. 5 shows the through-connection of the MOSFETs S1 and S5. The MOSFET S5 therefore connects one of the motor lines of the drive motor 20 in the length adjustment direction X to GND, while the second motor line receives positive voltage via the MOSFET S1. The MOSFETs S2,S3, S4 and S6 are off. The drive motor 20 therefore turns around to the right (clockwise). In order to control the speed by means of pulse width modulation—PWM for short—the MOSFET S5 is permanently switched on and the gate of the MOSFET S1 is exposed to the necessary signal in the form of a pulse width modulation control signal—PWM control signal or PWM signal for short. The steering column is extended in the length adjustment direction X. The drive motor 20' of the height adjustment mechanism Z is switched off.

FIG. 6 shows the counterclockwise movement of the drive motor 20 in the length adjustment direction X. The steering column is retracted in the length adjustment direction X. The MOSFETs S2 and S4 are switched on. The remaining MOSFETs are off. In order to control the speed by means of PWM, the MOSFET S2 is permanently switched on and a PWM control signal is applied to the MOSFET S4. The drive motor 20' of the height adjustment mechanism Z is switched off.

FIG. 7 shows the switching state for the raising of the steering column by the height adjustment mechanism Z. The MOSFETs S2 and S6 are switched on. The remaining MOSFETs are off. The MOSFET S2 is permanently switched on and a PWM signal is applied to the MOSFET S6. The drive motor 20' of the height adjustment mechanism Z turns to the right. The drive motor 20 of the length adjustment mechanism X is switched off.

FIG. 8 depicts the switching state for lowering the steering column by means of the height adjustment mechanism Z. The MOSFETs S3 and S5 are switched on. The remaining MOSFETs are off. MOSFET S4 is permanently switched on and a PWM signal is applied to the MOSFET S3. The drive motor 20' of the height adjustment mechanism Z turns round to the left. The drive motor 20 of the length adjustment mechanism X is switched off.

In the switching states shown in FIGS. 5 to 8, the full operating voltage is available for both rotational directions of the two drive motors 20 and 20' in both cases. A simultaneous adjustment by both drive motors is not envisaged. The adjustment steps in both directions follow one another. However, energizing of the two drive motors may take place at high frequency which is barely perceptible to the driver. This high frequency lies in a range from 5 Hz to 50 Hz, for example. A constant changeover between the two drive motors which are currently energized can be carried out in this case, in order to represent a quasi-simultaneous adjustment. Temporary storage of adjustment operations which are not allowed simultaneously is also conceivable, so that upon completion of a first adjustment operation, for example the desired height adjustment, a further adjustment operation, for example the length adjustment, can be carried out.

Figure 9:
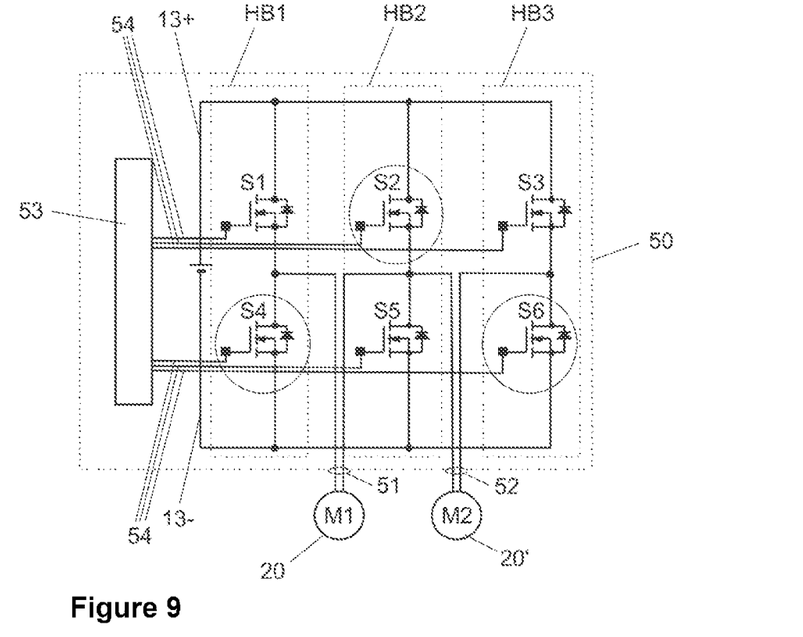
FIG. 9 is a block diagram as in FIG. 5 representing when both adjustment drives are energized.
Figure 10:
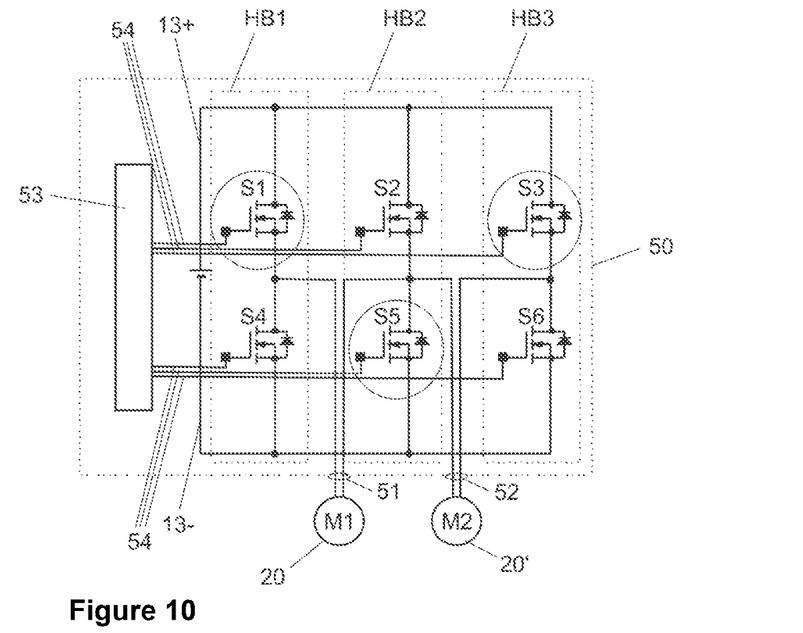
FIG. 10 is a block diagram as in FIG. 5 representing when both adjustment drives are energized.

FIGS. 9 and 10 show a simultaneous energizing of both drive motors 20,20' for the two adjustment directions in the length adjustment direction X and in the height adjustment direction Z by the center half bridge HB2. Depending on the desired polarity of a control voltage with which the two drive motors 20,20' are to be operated and which guarantees an opposite rotational direction of the two drive motors 20,20', either the second MOSFET S2 or the fifth MOSFET S5 of the second half bridge HB2 is closed.

The energizing depicted in FIG. 9 causes a retraction of the steering column in the length adjustment direction and a raising of the steering column in the height adjustment direction. For this purpose, MOSFETs S2 and S4 and S6 are switched on and the remaining MOSFETs are switched off. PWM signals are applied to the MOSFETs S4 and S6. The MOSFET S2 is operated in an effectively conducting manner. This means that depending on the clock frequency of the fourth and sixth MOSFETs S4, S6 which are operated cyclically, the effective voltage levels can be set for the two drive motors 20,20'.

In FIG. 10, on the other hand, the rotational direction of the drive motors 20,20' is reversed. The MOSFETs S1, S3 and S5 are switched on and the remaining MOSFETs are switched off. PWM signals are applied to the MOSFETs S1 and S3. The MOSFET S5 is operated in an effectively conducting manner. This results in an extension of the steering column in the length direction and a lowering of the steering column in the height adjustment direction.

The two simultaneously possible adjustment operations—retraction and raising and extension and lowering—of the steering column are frequently used movement patterns which are used with easy entry or the easy entry memory function, for example. The opposite simultaneous movement of the steering column, which is no longer possible with activation, is only requested very infrequently and can be implemented through the adjustment operation of the individual adjustment drives consecutively.

It is conceivable and possible for the previously described energizing possibilities to be combined with one another at random in a direct temporal sequence and, as a result, for an adjustment operation of a single adjustment drive to be carried out following a simultaneous adjustment of both adjustment drives, for example.

What is claimed is:

1. A steering column for a steering system of a motor vehicle, the steering column comprising:
 a first adjustment drive for adjusting the steering column in a length adjustment direction;
 a second adjustment drive for adjusting the steering column in a height adjustment direction, wherein the first and second adjustment drives each include a drive motor for adjusting the steering column; and
 a joint control unit for the drive motors, wherein the joint control unit includes three half bridges arranged in parallel and connected between two voltage potentials, with each half bridge having a high-side switch and a low-side switch connected in series via a connection point between the high-side switch and the low-side switch,
 wherein the connection point of a first of the three half bridges is electrically conductively connected via an electrical path that is switch-free to a first connection of a first drive motor of the drive motors,
 wherein the connection point of a second of the three half bridges is electrically conductively connected via electrical paths that are switch-free to a second connection of the first drive motor and to a first connection of a second drive motor of the drive motors,
 wherein the connection point of a third of the three half bridges is electrically conductively connected via an electrical path that is switch-free to a second connection of the second drive motor.

2. The steering column of claim 1 wherein the second connection of the first drive motor and the first connection of the second drive motor are configured to be energized alternately by the second half bridge.

3. The steering column of claim 1 wherein the second connection of the first drive motor and the first connection of the second drive motor are configured to be energized simultaneously by the second half bridge.

4. The steering column of claim 3 wherein a rotational direction of the first drive motor opposes a rotational direction of the second drive motor.

5. The steering column of claim 1 wherein the high-side switches and the low-side switches of the half bridges are n-channel MOSFETs.

6. The steering column of claim 5 wherein the n-channel MOSFETs are by default in an off state.

7. The steering column of claim 1 wherein the high-side switches and the low-side switches of the first and third half bridges are configured to be activated with a pulse width modulation (PWM) signal.

8. The steering column of claim 1 comprising:
 a support tube in which a casing tube is held displaceably in the length adjustment direction by way of the first adjustment drive; and
 a steering shaft mounted rotatably in the casing tube, wherein the support tube is fastened in a pivotable manner to a bracket that is connectable to a body of the motor vehicle, wherein pivoting the support tube causes adjustment of the casing tube and the steering shaft relative to the support unit in the height adjustment direction.

9. The steering column of claim 1 wherein the two drive motors are brushed DC motors.

10. A method for controlling two drive motors of a steering column for a steering system of a motor vehicle, wherein the steering column is adjustable in a length adjustment direction and a height adjustment direction, wherein a control unit for controlling the two drive motors comprises three half bridges arranged in parallel and connected between two voltage potentials, with each of the half bridges including a high-side switch and a low-side switch connected in series, the method comprising:
 forming a connection point between the high-side switch and the low-side switch of each half bridge, wherein the connection point of a first of the three half bridges is electrically conductively connected via an electrical path that is switch-free to a first connection of a first drive motor of the drive motors, wherein the connection point of a second of the three half bridges is electrically conductively connected via electrical paths that are switch-free to a second connection of the first drive motor and to a first connection of a second drive motor of the drive motors, wherein the connection point of a third of the three half bridges is electrically conductively connected via an electrical path that is switch-free to a second connection of the second drive motor; and energizing the first and second drive motors with the second half bridge.

11. The method of claim 10 comprising energizing the first and second drive motors simultaneously, wherein the low-side switch or the high-side switch of the second half bridge is permanently switched on and assigned to a first supply line, wherein the low-side switch or the high-side switch of the first and third half bridges are permanently or cyclically switched on and are assigned to second and third supply lines.

12. The method of claim 10 comprising driving the two drive motors in opposite directions, causing a retraction and raising of or an extension and lowering of the steering column.

13. The method of claim 10 comprising energizing the two drive motors alternately.

14. The method of claim 10 wherein the high-side switches and the low-side switches of the three half bridges are n-channel MOSFETs.

15. The method of claim 14 wherein the n-channel MOSFETs are by default in an off state.

16. The method of claim 10 comprising operating the two drive motors of the steering column without any switch between the connection point of the first half bridge and the first connection of the first drive motor.

17. The method of claim 16 comprising operating the two drive motors of the steering column without any switch between the connection point of the third half bridge and the second connection of the second drive motor.

18. The method of claim 17 comprising operating the two drive motors of the steering column without any switch between the connection point of the second half bridge and the second connection of the first drive motor and without any switch between the connection point of the second half bridge and the first connection of the second drive motor.

* * * * *

UNITED STATES PATENT AND TRADEMARK OFFICE
CERTIFICATE OF CORRECTION

| | |
|---|---|
| PATENT NO. | : 11,591,001 B2 |
| APPLICATION NO. | : 17/290803 |
| DATED | : February 28, 2023 |
| INVENTOR(S) | : Miklos Siklodi, Gergoe Szegoe and Daniel Vitalis |

It is certified that error appears in the above-identified patent and that said Letters Patent is hereby corrected as shown below:

On the Title Page

In item (73) "Assignees", the city:
Esser
Should be:
Essen

Signed and Sealed this
Seventeenth Day of September, 2024

*Katherine Kelly Vidal*

Katherine Kelly Vidal
*Director of the United States Patent and Trademark Office*